United States Patent

[11] 3,614,079

| [72] | Inventors | George Harrison<br>6901 W. 30th St., Berwyn, Ill. 60402;<br>Nelson K. Harrison, 432 Shanstone Road,<br>Riverside, Ill. 60546 |
|---|---|---|
| [21] | Appl. No. | 768,054 |
| [22] | Filed | Oct. 16, 1968 |
| [45] | Patented | Oct. 19, 1971 |

[54] METHOD AND APPARATUS FOR MELTING METAL CHIPS
9 Claims, 3 Drawing Figs.

[52] U.S. Cl. ............................................. 266/33 S, 75/65, 214/23
[51] Int. Cl. ................................................ C21b 11/00
[50] Field of Search ........................................ 75/62, 65; 266/33, 1; 214/23

[56] References Cited
UNITED STATES PATENTS

| 2,402,498 | 6/1946 | Kohlhepp | 266/33 |
| 2,265,284 | 12/1941 | Hulme et al. | 266/33 |
| 2,300,141 | 10/1942 | Whitzel | 214/35 |
| 2,343,337 | 3/1944 | Somes | 266/33 |
| 2,446,637 | 8/1948 | Crampton et al. | 75/65 |
| 2,624,565 | 1/1953 | Kompart | 266/33 |
| 3,202,408 | 8/1965 | Huhtala et al. | 266/33 |

Primary Examiner—Gerald A. Dost
Attorney—Spector & Alster

ABSTRACT: Method and apparatus for melting oil-contaminated brass chips comprises a reverberatory furnace and a melter tube that projects through the side of the furnace and into the bath of metal therein. Oil-contaminated metal chips are repeatedly charged into the tube by a plunger. The tube is perforated to expose the chips to the liquid metal of the bath and to the combustion chamber of the furnace. The chips are heated by the bath, vaporizing the oil and expelling it into the combustion chamber for burning and thereby maintain the chips and bath subjected to a reducing atmosphere. The heat of the bath melts the chips, the liquid metal from the melted chips flowing out of the tube.

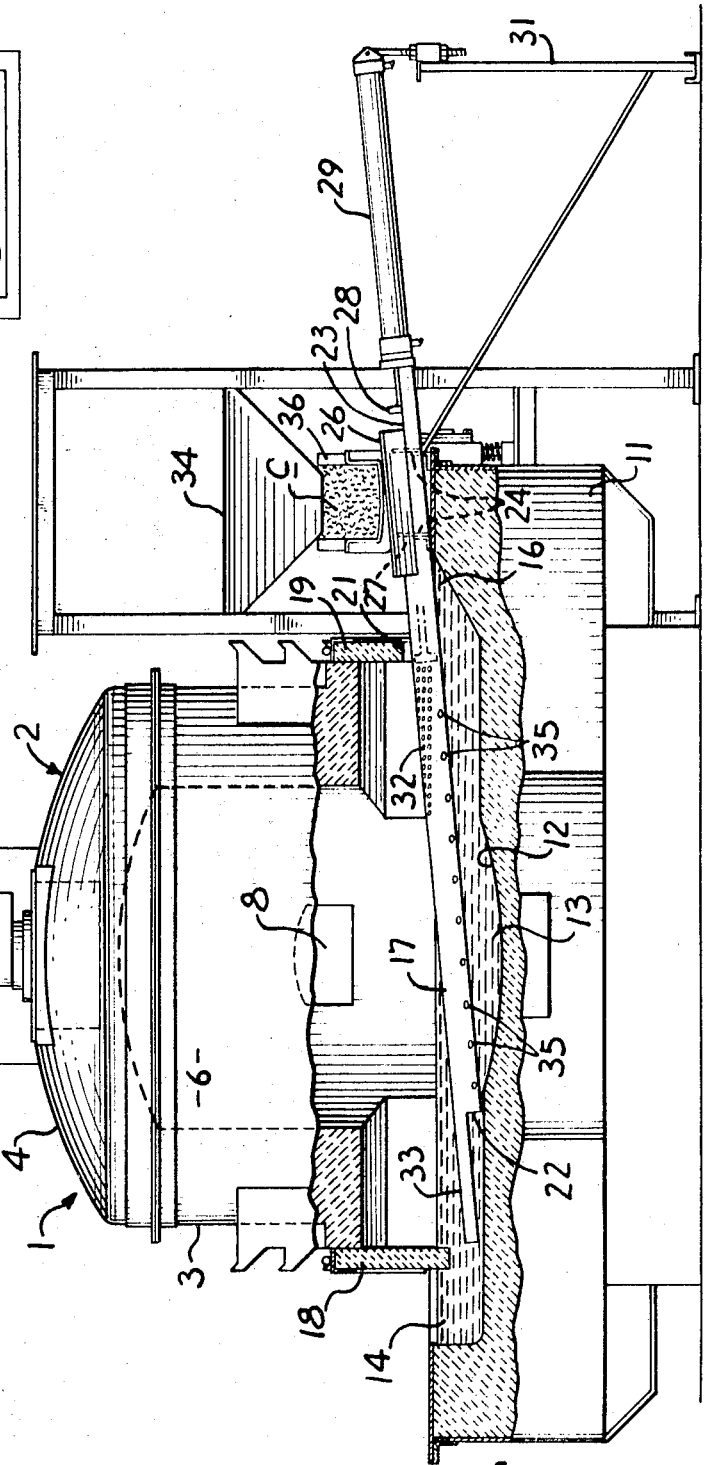
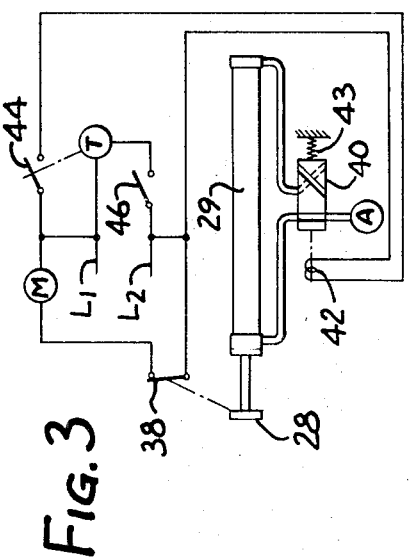
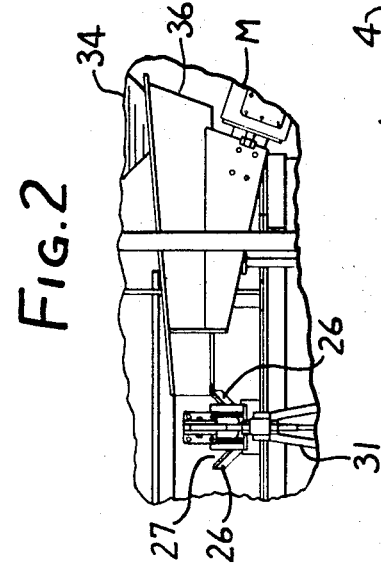
INVENTORS
GEORGE HARRISON
NELSON K. HARRISON
by: Spector & Alter
ATTYS.

METHOD AND APPARATUS FOR MELTING METAL CHIPS

This invention relates to improved methods and apparatus for melting scrap metal, particularly chips of brass that are contaminated with oil.

It is an object of this invention to provide a method and apparatus for remelting scrap metal such as brass chips that result from machining operations. This scrap, which is generally coated with oil, is treated to remove the oil and is then remelted in such a manner as to provide a reduced amount of dross and oxide and a correspondingly increased amount of metal recovery.

In accordance with the method and apparatus of the invention, a furnace has a combustion chamber to which the surface of a shallow bath of melt of the metal is exposed. The heat for the melt is provided principally by radiant heat from the refractory walls of the combustion chamber without the flame from the furnace burner impinging directly onto the metal. Charges of oil-contaminated scrap are pushed by a plunger into the furnace through a melter tube. This tube projects through the lower end of the sidewall of the furnace and into the combustion chamber and extends downwardly into the melt with the tube having a lower discharge end below the level of the melt. The tube has a treating zone between its intake and discharge ends that has a perforated portion in the combustion chamber so that when a charge of metal is introduced into the tube and advanced into the treating zone, the heat from the bath vaporizes the oil causing it to be expelled through the perforated zone of the tube and into the combustion chamber for at least partial combustion within the furnace. The subsurface part of the tube at the treating zone and the length of the tube therebelow may also be perforated so that molten metal from the bath may quickly contact the scrap over a large area thereof. The vaporization and burning of the oil creates a reducing atmosphere in the tube and in the combustion chamber to inhibit the formation of oxides in the tube and on the surface of the melt. As another charge of metal is introduced into the tube, the charge at the treating zone, a part of which may have started to melt, is pushed further down the tube for continued melting and finally for discharge into the melt below its surface. Some liquid metal resulting from the melted scrap may also flow into the bath through the holes in the subsurface portion of the tube. The decontamination of the scrap, melting and introduction thereof into the bath is accomplished substantially without agitation of the melt or of the charge of metal. The charging of the tube may be repeated automatically at suitably timed intervals, each time placing more metal in the treating zone and advancing more treated metal down the tube for continued melting.

In the drawing:

FIG. 1 is an elevational view partly in section of apparatus constructed in accordance with and used for carrying out the method of this invention;

FIG. 2 is a fragmentary elevational view of FIG. 1; and

FIG. 3 is a schematic of a circuit used for operating the apparatus.

Referring in more detail to the drawing, 1 designates apparatus comprising a reverberatory furnace 2 having an enveloping side 3 and a dome 4 which define a combustion chamber 6. The furnace 2 may be heated in a suitable manner as by a gas burner 7 in the dome 4. Exhaust gases in the combustion chamber 6 may pass outwardly through a flue opening 8 in the side 3 and then upwardly through a flue pipe 9.

The furnace 2 also includes a hearth 11 of refractory material that defines a shallow container 12 for holding a shallow bath of liquid metal 13, for instance brass, the surface of which is exposed to the combustion chamber 6 thereabove. At two opposite places, the container 12 extends laterally beyond the side 3 to provide an exit well 14 from which liquid metal may be ladled from the melt 13, and an entrance well 16 at which a melter tube 17 projects laterally of the furnace, the tube 17 being for purposes presently more fully appearing. At each well 14, 16 the furnace has closures 18, 19 which are mounted in a known manner for raising and lowering, the closure 19 having an opening 21 at which the melter tube 17 projects therethrough, whereby the closure 19 provides an air shield around the tube 17. The closure 19 also serves as a skimming plate to reduce the amount of dross passing thereby.

The flame from the burner 7 swirls around the top of the dome 4 inside the combustion chamber 6 and does not impinge directly onto the metal 13. The dome 4 and side 3 are, however, heated and the heat from the refractory material of the dome 4 and sidewall 3 is radiated onto the metal 13 to keep it liquified.

The melter tube 17, which may be of stainless steel, extends from its discharge end 22 below the level of the metal 13 upwardly at a small angle and into the combustion chamber 6 and from there through the closure opening 21 to its intake end 23 just outside of the furnace. At the intake end 23, the tube 17 is mounted on the hearth 11 by any suitable structure, including the angle bars 24. The upper side half of the tube 17 is cut away at the intake end 23 and is provided with side plates 26, 26 that cooperate with the lower half of the tube 17 to form a trough 27. A plunger 28 reciprocates in the tube 17 and is driven by a plunger cylinder 29 adjustably supported in any suitable manner, as by a frame 31.

Within the combustion chamber 6, the tube 17 has a treating zone with a portion thereof below the surface of the metal and a portion above the surface of the bath of metal. The part of the treating zone above the surface of the metal has holes 32 to provide communication between the interior of the tube 17 and the combustion chamber 6. The portion of the tube 17 below the surface of the bath of metal also has holes 35 to admit liquid metal into the tube 17 thereat. The discharge end 22 of the tube 17 has its lower half cut away to provide a flange 33 that extends approximately to the closure 14.

Brass chips from machining operations are first centrifuged of excess oil, leaving the chips with about 3 percent by weight of oil coating. These chips c are then loaded into a chip hopper 34 that delivers them into a conventional vibratory feeder 36 that is adjacent to the trough 27. The feeder 36 feeds the chips c to the trough 27 so long as the plunger 28 is in the retracted position, namely in the position shown in full lines, FIG. 1. The feeder 36 has an adjustable speed driver M that stops except when the plunger 28 is in its retracted position.

With a supply of chips c in the trough 27 the plunger 28 is moved to the left, FIG. 1, pushing a charge of approximately known quantity from the trough 27 down the tube 17 to the treating zone, with the result that the charge of metal immediately contacts the liquid metal 13, both at the bottom end of the charge and over the length thereof, due to the holes 25. The chips in that charge are heated by the melt, vaporizing the oil, which is then discharged from the tube 17 through the holes 32 where it is burned in the combustion chamber 6, creating a reducing atmosphere therein to inhibit dross formation on the surface of the melt. Some oil may possibly burn in the tube 17 itself. The vaporization and/or burning of oil in the tube 17 displaces or consumes oxygen around the chips in the melter tube so that the chips are heated in a reducing atmosphere rather than being "burned" to form a large percentage of oxide. The presence of the subsurface holes 35 permits the molten bath metal to contact quickly a large number of the chips c over a substantial portion of the lengths of the charges and the being melted chips, so that the melting time for the chips is decreased. Since the charges of metal chips are loosely packed, some air is necessarily present. By reducing the melting time, the chips have less time to "roast" and thus form a smaller amount of dross.

The plunger 28 retracts starting the feeder 34 to charge the trough 27. After a suitable predetermined time interval, the plunger 28 pushes a new charge of oil-contaminated chips c down the melter tube 17 to the treating zone and the previous charge is pushed further down the tube to a melting zone of the tube 17 below the melt level where further melting takes place. The melted metal flows out of the discharge end 22. Some liquid metal from the chip melt may also flow out of the holes 35.

The foregoing is repeated automatically be a timed stroke of the plunger 28. As the chips advance down the tube 17, they are melted by the heat of the metal bath substantially without agitation of either the bath or the chips.

Metal may be ladled out of the bath at the exit well 19 after first skimming off any dross thereat. Melted metal coming out of the discharge opening 22 may carry with it a small amount of dross which is lighter than the metal itself. This dross tends to be caught by the flange 33 and directed, due to flow of the metal, toward the well 19 rather than being allowed to accumulate on the surface of the metal within the combustion chamber 6.

Automatic control of the operation of the plunger 28 and feeder 36 may be accomplished in any suitable manner, for example as shown in FIG. 3. The plunger 28 closes a normally open limit switch 38 only when the plunger is in its retracted position. With the switch 38 closed, the vibratory feeder driver M receives current from power lines L1, L2 to operate the feeder. Air from a source A is selectively supplied through a conventional reversing valve 40 to opposite ends of the cylinder 29. When valve 40 is operated by a solenoid 42 to admit air into the right-hand (FIG. 3) end of the cylinder 29 to advance the plunger 28 down the melter tube 17, the switch 38 is opened, stopping the feeder 36. When solenoid 42 deenergizes, valve 40 is shifted by return spring 43 to introduce air into the left-hand end of the cylinder 29 to retract the plunger 28 and close switch 38, starting the feeder 36. The solenoid 42 operates periodically and stays energized for a predetermined length of time, in accordance with the setting of an electrically operated adjustable timer T that contains conventional mechanism for opening and closing the switch 44. An on-off switch 46 for the timer T may be provided.

When the plunger 28 moves from its fully extended position illustrated in dot-dash lines in FIG. 1 to its retracted position, it leaves a mass of chips within the tube 17 and above the level of the liquid metal therein. While the next charge is accumulating in the trough, the plunger is not disturbing the film what will have formed on the surface of the liquid metal within the tube 17. This film raises the vapor pressure therebelow and inhibits boiling away of the zinc content of the molten brass. Whenever the film over the liquid metal is broken, boiling of the zinc (which may be 40 percent of the metal) commences, and continues until the solid film is reformed. By the present invention, the time when the solid surface layer at the top of the liquid metal within the tube 17 is being broken is a small part of the total time, and the positive feed of the metal permits the use of a tube 17 of small diameter.

The precise construction and method herein shown and described is merely illustrative of the principles of the invention.

What is new and desired to be secured by Letters Patent is:

1. A method of decontaminating and melting metal comprising providing a furnace with a combustion chamber to which the surface of a melt of the metal is exposed and heating the combustion chamber to maintain the melt in the molten condition, introducing a mass of contaminated metal into said furnace and providing communication between said mass and said combustion chamber, exposing the contaminated metal to sufficient heat within the furnace to vaporize the contaminant and expel the contaminant from the mass of metal and into said combustion chamber for at least partial combustion in the furnace and at the same time maintain a reducing atmosphere around said mass of metal as it is being decontaminated, and introducing the decontaminated metal into the melt.

2. A method of decontaminating and melting metal comprising providing a melt of metal in a furnace and with the surface of the melt being exposed to an atmosphere of a chamber of the furnace which is above the melt, providing a tube that extends through said surface and has a discharge opening therebelow and a zone of the tube that is perforated above said surface for providing communication at said perforated portion of said zone between the interior of said tube and said chamber atmosphere, introducing contaminated metal into said tube to bring said metal to said zone and by heat comprising heat from said melt expelling said contaminant from said metal and through the perforated portion of said zone and into said chamber, and introducing decontaminated metal into the melt at said discharge opening.

3. A method according to claim 2 including providing at said zone communication through the wall of the tube between said contaminated charge and said melt.

4. Apparatus for decontaminating and melting metal comprising a furnace with a combustion chamber, means for containing a melt of liquid metal with the surface thereof exposed to said combustion chamber, means for heating the combustion chamber to maintain the melt in a molten condition, means for providing communication between a mass of contaminated metal and the combustion chamber, means for exposing the contaminated metal to sufficient heat within the furnace to vaporize said contaminant and expel the contaminant from the metal and into said combustion chamber for at least partial combustion in the furnace and at the same time maintain a reducing atmosphere around said metal as it is being decontaminated, and means for introducing the decontaminated metal into the melt.

5. Apparatus according to claim 4 having a tube that has a discharge opening below said surface and a zone at which contaminant is expelled from the metal, and said tube zone is perforated above and below said surface.

6. Apparatus for melting metal comprising a for maintaining a melt of liquid metal, a tube extending through the surface of said melt and having an intake end above said surface and a discharge and below said surface, said tube also having a gas outlet zone within the container and above said surface for discharging into said container gases generated in said tube, and means for introducing solid metal into said tube from said intake opening to said zone for heating of the solid metal thereat by heat from the melt and for conveying being-melted metal in the tube from said zone toward said discharge opening.

7. Apparatus according to claim 6 in which said zone is also below the level of melt and is perforated thereat to pass liquid metal therethrough.

8. Apparatus according to claim 6 in which said tube projects laterally of the portion of the container that defines the periphery of the melt.

9. Apparatus according to claim 8 in which said container has a well at a peripheral portion thereof and said discharge end has a flange above the discharge opening at said end, said flange extending substantially to the region of said well.